United States Patent [19]

Cycon et al.

[11] Patent Number: 4,770,607
[45] Date of Patent: Sep. 13, 1988

[54] ROTOR BLADE CONSTRUCTION FOR CIRCULATION CONTROL AIRCRAFT

[75] Inventors: James P. Cycon, Orange, Conn.; Kenneth Reader, Monrovia, Md.

[73] Assignee: United Technologies Corporation, Hartford, Conn.

[21] Appl. No.: 43,058

[22] Filed: Apr. 27, 1987

[51] Int. Cl.$^4$ .............................................. B64C 21/08
[52] U.S. Cl. .................... 416/90 A; 416/20 R
[58] Field of Search ............... 416/20 R, 90 A, 90 R, 416/20 A

[56] References Cited

U.S. PATENT DOCUMENTS

| | | | |
|---|---|---|---|
| 3,139,936 | 7/1964 | Davidson et al. | 170/135.4 |
| 3,524,711 | 5/1968 | Cheeseman et al. | 416/20 |
| 3,554,664 | 1/1971 | Cheeseman et al. | 416/90 A |
| 3,873,233 | 3/1975 | Linck | 416/20 R X |
| 3,891,163 | 6/1975 | Wilkerson et al. | 416/20 R X |
| 4,137,008 | 1/1979 | Grant et al. | 416/20 R |
| 4,626,171 | 12/1986 | Carter et al. | 416/90 A |

OTHER PUBLICATIONS

Barnes, Kirkpatrick and McCoubrey, "Circulation Control Rotor Flight Demonstrator"—Aug. 1976.
Reader, Kirkpatrick and Williams, "Status Report on Advanced Development Program Utilizing Circulation Control Rotor Technology"—Sep. 13–15, 1978.

Primary Examiner—Everette A. Powell, Jr.
Attorney, Agent, or Firm—Russell M. Lipes, Jr.

[57] ABSTRACT

A circulation control aircraft rotor blade of advanced composite material having a spanwise Coanda surface 16 and a plurality of spanwise extending flexible panels 18 cooperating with the Coanda surface to define slots for the discharge of compressed air from a duct 14 within the blade with each panel having flexure means 34 associated with attaching means 24 and limiting means 38 for establishing a slot opening preload and a slot maximum opening and with limiting means 38 providing structural equilibrium and reduced bending moments in the inboard corners of the air duct.

2 Claims, 3 Drawing Sheets

ROTOR BLADE CONSTRUCTION FOR CIRCULATION CONTROL AIRCRAFT

This invention was made with Government support under Contract NAS2-11771 awarded by National Aeronautics and Space Administration. The Government has certain rights in this invention.

TECHNICAL FIELD

This invention relates to a rotor blade for an aircraft utilizing a circulation control rotor system and more particularly to a spanwise air passage slot construction for the blade.

BACKGROUND ART

An X-wing aircraft is a rotary wing aircraft that uses a rigid rotor/wing utilizing circulation control airfoils. The rotor is driven mechanically and the rotor blades operate essentially in fixed pitch. The rotor may rotate, as in a helicopter, or it may be stopped and positioned so as to act like a fixed wing. Collective and cyclic control is achieved by control of air circulation about a Coanda surface on the blade airfoils. This is done by blowing compressed air through leading edge and trailing edge duct in the rotor blades and modulating the amount of air being ejected through spanwise slots on the leading and trailing edges of the rotor blades.

The rotor system for an X-wing aircraft includes a hub and attached rotor blades and a pneumatic system for delivering pressurized air separately to the leading edge and the trailing edge of the individual rotor blades at a desired pressure and mass flow. The pneumatic system includes a compressor, a stationary air supply chamber, valving for controlling the flow of air from the chamber to the blades, and a rotating air distribution arrangement for conducting air separately to the leading edge and trailing edge of the blades.

In circulation control airfoils, pressurized air is ejected from spanwise openings or slots along the upper side of the rounded airfoil leading/trailing edge Coanda surface. The airflow from the slots attaches to the rounded leading/trailing edge which increases the circulation to provide a corresponding lift increase over an airfoil having no ejected air. While the discussion throughout this description pertains to and describes slots located in the upper surface of blades to provide upward lift, it should be recognized that a slot may be desired on the blade lower surface for lift control. For a given blade internal pressure and aerodynamic condition, the lift change due to circulation control is proportional to the area of the slot opening up to a certain limit. When the slot opening exceeds this limit no additional lift is achieved, a condition analogous to stall in a conventional airfoil. Since an X-wing circulation control airfoil is symmetrical about its half chord, the leading edge on the advancing side of the blade path disc becomes the trailing edge on the retreating side, and vice-versa. To maximize performance as the rotor slows down, it is desirable that the "local" leading edge slot be closed at all azimuth positions. The use of conventional preload springs for closing the slot is not desirable primarily because of the weight which would be involved.

A rotor blade construction having adjustable spanwise slot openings is described in U.S. application Ser. No. 664,738 which issued Dec. 2, 1986 as U.S. Pat. No. 4,626,171. This construction is an alternative configuration which resulted from scale model testing of the patented construction and which offers possible load, weight and stress benefits.

Davidson et al U.S. Pat. No. 3,139,936 describes a helicopter control mechanism, Cheeseman et al U.S. Pat. No. 3,524,711 describes a helicopter rotor blade having spanwise extending slots, and Cheeseman et al U.S. Pat. No. 3,554,664, Linck U.S. Pat. No. 3,873,233 and Grant et al U.S. Pat. No. 4,137,008 describe circulation control airfoils.

A circulation control rotor system is described in the report titled "Circulation Control Rotor Flight Demonstrator" by David R. Barnes, Douglas G. Kirkpatrick and George A. McCoubrey presented at an American Helicopter Society Mideast Region Symposium in August, 1976. The report titled "Status Report on Advanced Development Program Utilizing Circulation Control Rotor Technology" by Kenneth R. Reader, Douglas G. Kirkpatrick and Robert M. Williams, Paper No. 44 presented at the Fourth European Rotorcraft and Powered Lift Aircraft Forum, Stresa, Italy, Sept. 13-15, 1978 describes an X-wing development program.

DISCLOSURE OF INVENTION

An object of the present invention is to provide an improved construction of spanwise air passage slot structure of advanced composite material in the rotor blade of a circulation control aircraft.

Another object of the invention is to provide a circulation control rotor blade of advanced composite material having spanwise slot defining structure which has independently adjustable preload and slot opening travel and which has minimum critical load area and maximum structure efficiency.

Still another object of the invention is to provide a circulation control rotor blade of advanced composite material having spanwise slots through which compressed air is discharged and in which the blade is constructed so as to minimize distortion of the air duct due to internal air pressure or external loads.

The foregoing and other objects, features and advantages will be apparent from the specification and claims and from the accompanying drawings which illustrate an embodiment of the invention.

BEST MODE FOR CARRYING OUT THE INVENTION

Figure 1:
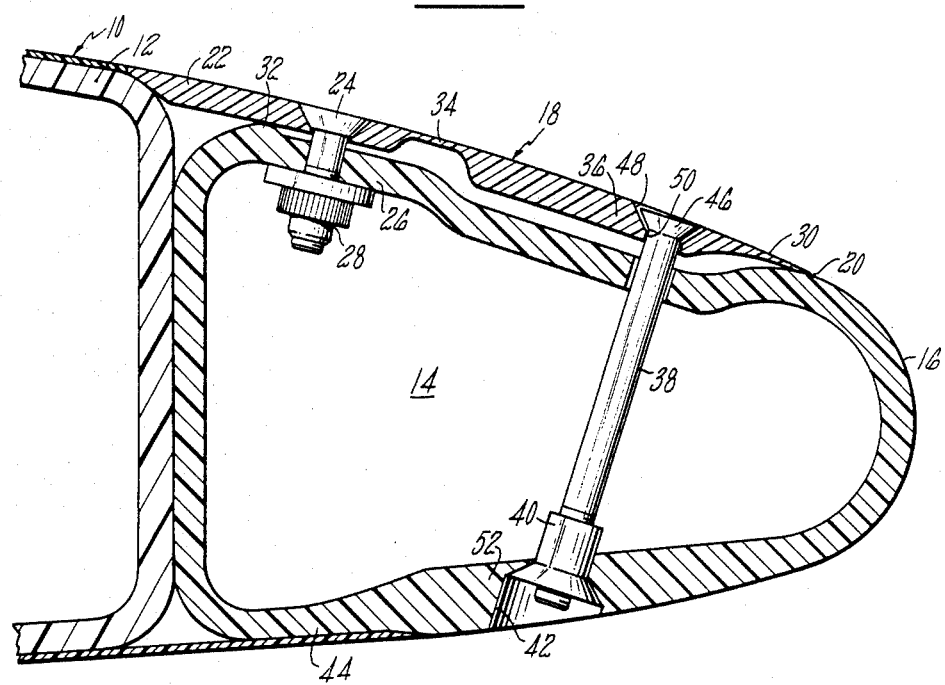
FIG. 1 is a sectional view through a rotor blade constructed in accordance with the invention showing a closed slot condition.

In the rotor blade construction shown in FIG. 1 blade 10 is of advanced composite construction and includes spar section 12 and compressed air duct 14, the spar section and duct being bonded integrally together. The edge of the blade, the leading edge and the trailing edge, is defined by Coanda surface 16. This surface may be either a portion of the compressed air duct as shown or it may be a separate element. Flexible panel 18 of advanced composite material extends spanwise along the upper surface of the blade and through cooperation with the upper surface of the Coanda defines slot 20 through which compressed air may be discharged from duct 14. In the event of a slot along the lower surface of the Coanda, the flexible panel would extend along the lower surface of the blade.

Flexible panel 18 is attached to the upper surface of the blade at a plurality of spaced stations along the blade span, or a section of the blade span. In FIG. 1, rearward portion 22 of the panel is secured by a row of screws 24 which extend through upper surface 26 of duct 14 and into fastener 28. In the normal position of the panel, outer edge or lip 30 is in contact with Coanda surface 16 and slot 20 is closed. Local thickness area 32 is formed on upper surface 26, as by the inclusion of a fiberglass or graphite roving or a shim, to function as a pivot for flexible panel 18. The height of area 32 is varied so as to establish the desired load on the panel and lip 30 and thus the air pressure at which the lip would begin to move away from the Coanda surface to open the slot. The panel has a reduced thickness or flexure section 34 along its midspan between rearward portion 22 and forward portion 36 about which the panel bends as a result of preload or an increasing air pressure in duct 14.

Slot limit screw 38 extends through forward portion 36 of panel 18 and threads into fastener 40 fixed within stepped hole 42 in lower surface 44 of air duct 14. The head of screw 38 is flared as at 46 and the flared head is adapted to contact and cooperate with countersunk surface 48 on hole 50 through forward portion 36 of the panel. The position of the head of the screw thus limits upward movement of the panel forward portion.

The lower surface of the duct is built up as at 52 as to stiffen the surface and preclude or minimize any flexing of hole 42 when fastener 40 is resisting any loads imposed thereon by limit screw 38. Flexing of the lower surface would change the relationship of screw head 46 and panel countersunk surface 48 which would result in a variation of slot opening characteristics. This is a condition which is to be avoided.

In order for the air to flow from the duct through the slot, it is necessary that holes be made in upper surface 26 of the duct. These openings tend to weaken the upper surface with respect to the lower surface of the duct and make it more subject to bending due to pressure loads. This bending would involve the Coanda surface and would cause a variation of its position and thus variation of the slot dimension. However, the employment of the flexible panel in the construction and the tying of its movable forward portion structurally to the bottom surface of the duct introduces equilibrium into the structure. There is essentially a balancing of forces with the result that bending moments are minimized. The structure thus is stronger in comparison to a duct which exhibits bending and distortion and potentially lighter in weight in comparison to a duct wherein thick walls preclude such distortion.

Figure 2:
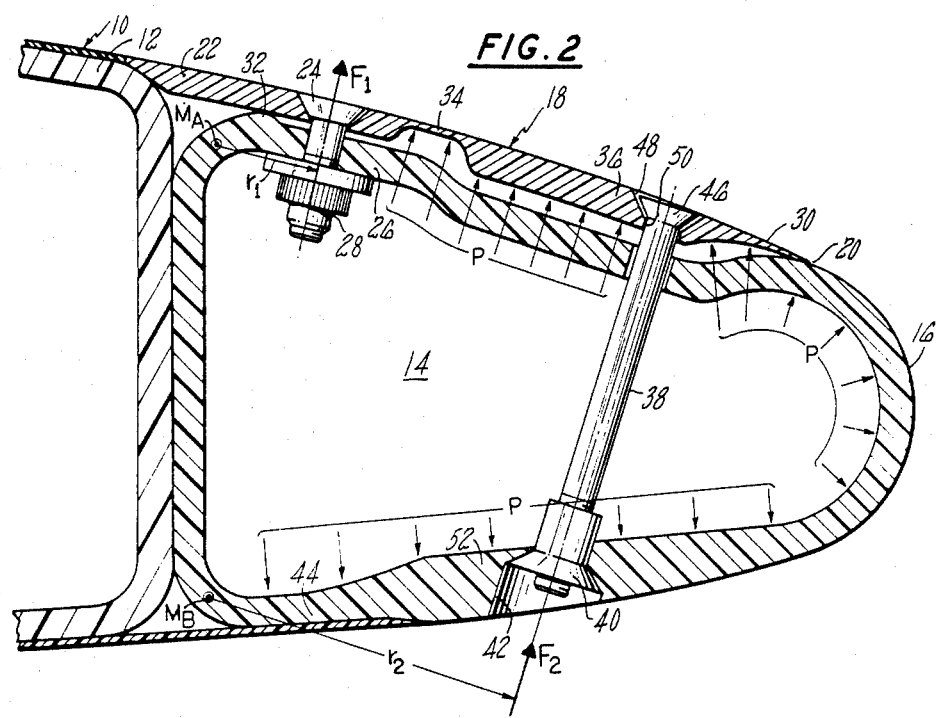
FIG. 2 is a showing of forces acting on the air duct.

FIG. 2 shows generally the forces acting on the inboard corners of the air duct. P is the pressure of the air in the duct. The major bending moment $M_A$ about the upper inboard corner would be load $F_1$ which results from the preload on flexible panel 18 acting through radius arm $r_1$. This is a relatively small bending moment. The major bending moment $M_B$ about the lower inboard corner would be load $F_2$. $F_2$ is the pressure load on the area 36 of flexible panel 18 outboard of flexure section 34 as imparted to the lower surface of the air duct by limit screw 38. $M_B$ is the air pressure P along the bottom air duct surface minus $F_2$ times the radius arm $r_2$. By virtue of the presence of the flexible panel and the air holes in the upper surface 26 of the duct, the air pressure acting on opposite sides of the upper surface in the area opposite panel forward portion 36 is effectively neutralized. Thus, the bending moment about the lower inboard corner is minimized since the downward air pressure force acting on the lower duct surface is reacted through screw 38 by the upward air pressure force on panel 18.

Figure 3:
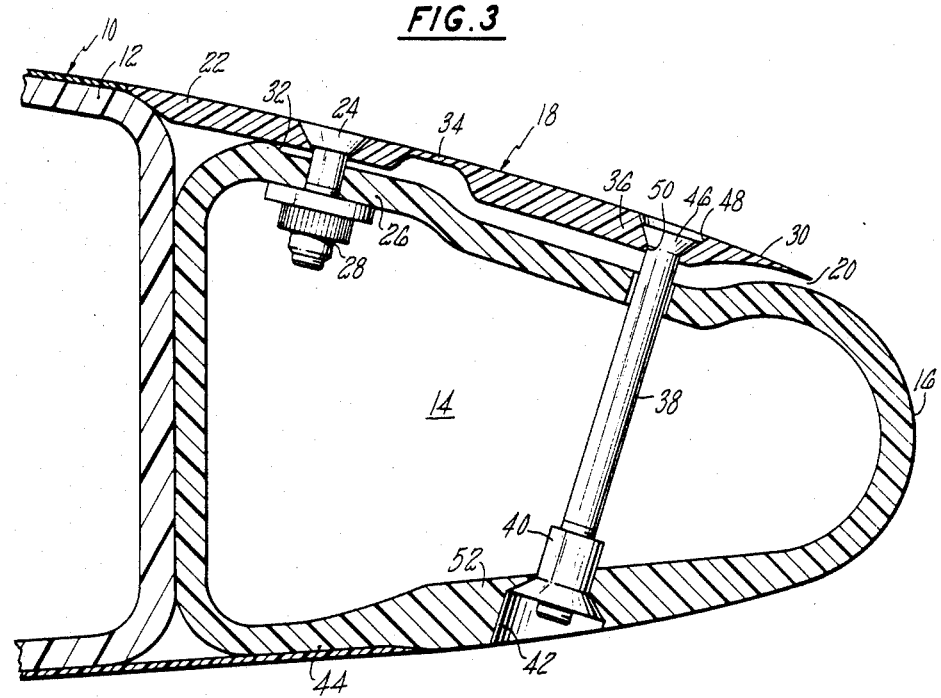
FIG. 3 is a sectional view similar to FIG. 1 showing an open slot condition.

FIG. 3 shows the nature of the construction with slot 20 being fully open. Limit screw 38 fits loosely within countersunk hole 50 and the position of flared head 46 with respect to countersunk surface 48 establishes the maximum opening of slot 20. The chordwise location of screw 38 with respect to slot 20 must be sufficiently back from the slot so that it does not interfere with airflow through the slot opening. The relative long length of the limit screw permits limited bending of the screw to compensate for any misalignment of the flared end of the screw and its mating countersunk surface in the flexible panel.

When the flexible panel is installed in position on thickness area 32 and with lip 30 against Coanda surface 16, tightening of screws 24 results in flexure of the panel along section 34 between the screws and the lip. The thickness and elastic properties of this panel area through layup of the composite structure are specifically designed to afford the desired flexing characteristics. Preload is established by pressurizing duct 14 and varying the thickness of area 32 until the desired minimum operational pressure for opening slot 20 is reached.

After preload has been established, the axial position of limit screw 38 is set so as to establish the maximum opening of slot 20. This is done by increasing the pressure in duct 14 beyond the minimum operational pressure to the desired maximum operational pressure. The increase in pressure will cause forward portion 36 of panel 18 to flex away from Coanda surface 16, the panel flexing along section 34. Limit screw 38 is set to the flexed position of forward portion 36 when duct air pressure is at its maximum operating pressure.

During operation, air at variable pressure is delivered to duct 14 at the root end of the blade and then passes through openings or holes in the duct to slot 20. Because of the preload on panel 18, slot 20 is closed until the pressure of the air in duct 14 reaches the minimum operating pressure. As the air pressure exceeds that value, lip 30 moves away from Coanda surface 16. Compressed air then will begin to flow from the duct over the Coanda surface. As the pressure of the air increases, lip 30 will continue to move away from the Coanda surface until, at the maximum operating pressure, contact is made with flared head 46 on screw 38. A greater air pressure will not further increase the opening of slot 20.

Figure 4:
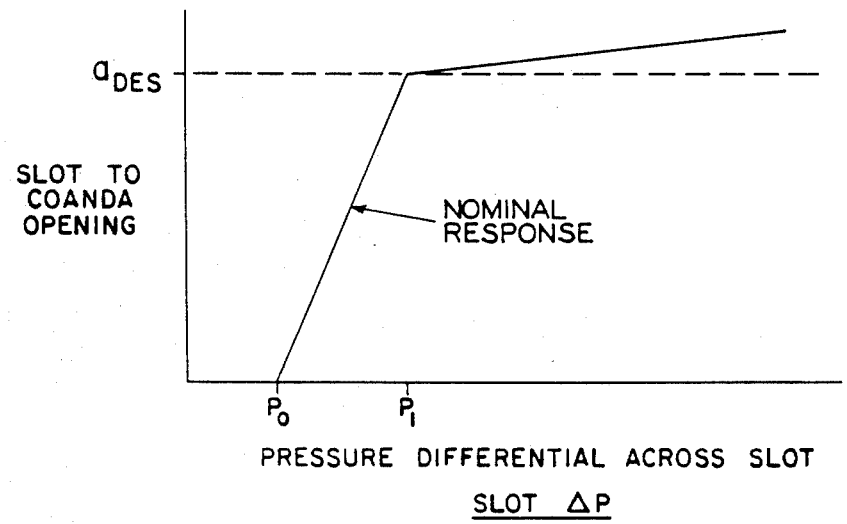
FIG. 4 is a graph showing a plot of slot opening versus slot differential opening.

The actual operation of the slot is shown in the plot of FIG. 4 where $\alpha_{DES}$ is the desired maximum slot opening, $P_O$ is the preload pressure setting, and $P_1$ is the pressure at which maximum opening occurs. The small increase in slot opening shown in the plot as pressures increase above $P_1$ reflects the slight bending of panel 18 which occurs outward from screw 38. The slope of the plot between $P_0$ and $P_1$ is defined in accordance with performance requirements and is related to and may be varied by the flexure characteristics of panel section 34.

Figure 5:
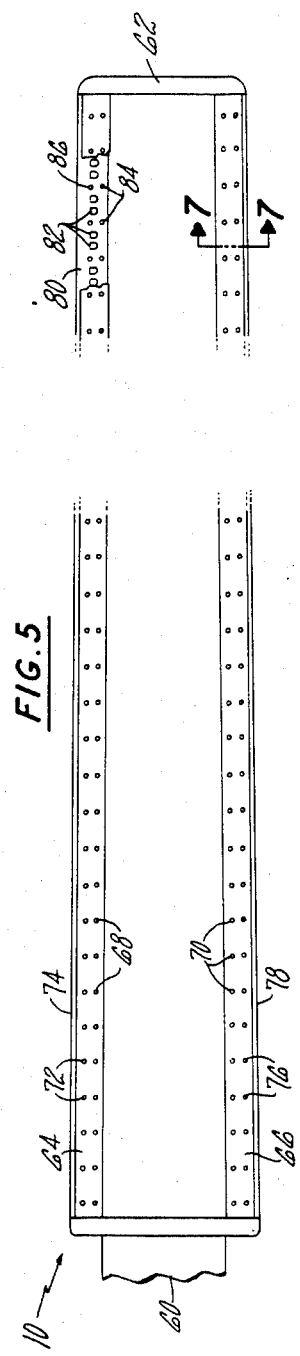
FIG. 5 is a plan view of a rotor blade constructed in accordance with the invention.

The plan view of FIG. 5 shows a rotor blade constructed in accordance with the invention. Blade 10 having root 60 and tip 62 has flexible panels 64 and 66 at its leading and trailing edges respectively. Panel 64 is secured to the blade structure by a row of screws 68 inboard from the blade leading edge and panel 66 is secured to the blade by parallel rows of screws 70 inboard from the blade trailing edge. Slot limit screws 72 along the outer edge of panel 64 permit the adjustment of the maximum opening of the slot between the panel and leading edge Coanda surface 74 and slot limit screws 76 along the outer edge of panel 66 permit the adjustment of the maximum opening of the slot between the panel and trailing edge Coanda surface 78. Panels 64 and 66 do not necessarily extend the full length of the blade span. There may be a number of additional panels along the blade span. A principal reason for a multi-panel construction is to afford easy replaceability of panel sections in the event of wear or damage. The spanwise distance between adjacent screws is related to their effect on airflow through the slot as well as the compressed air loading on the panels.

Figure 6:
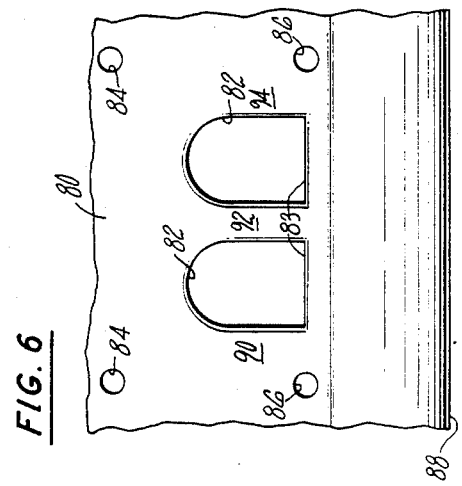
FIG. 6 is an enlarged view of a portion of the upper surface of the air duct.

In the tip portion of the blade, as shown in FIG. 5 for clarity of illustration, the leading edge does not have a portion of the flexible panel attached thereto. The structure of the underlying air duct 80 is visible with its air holes 82, attachment screw holes 84 and slot limit screw holes 86. An enlarged plan view is shown in FIG. 6 of a portion of the upper surface of air duct 80. The leading edge of the blade is defined by duct Coanda surface 88. In this view, the particular shape of air holes 82 can be seen. While the inboard edge of the holes is shown as circular, the outboard edge of the holes is rectangular as at 83, thus affording an increased airflow area without conpromising structure efficiency and minimizing pressure loss. The forward location and shape of the holes reduces the amount of turning of the air as it exits from the slot. The strap areas of the duct, those areas 90, 92 and 94 connecting the inboard portions of the duct with the outboard portions, are not sufficiently reduced in area to impair structural integrity. The duct in effect is a continuous plenum and there are no internal air pressure forces causing bending which would result in movement of the Coanda surface.

Figure 7:
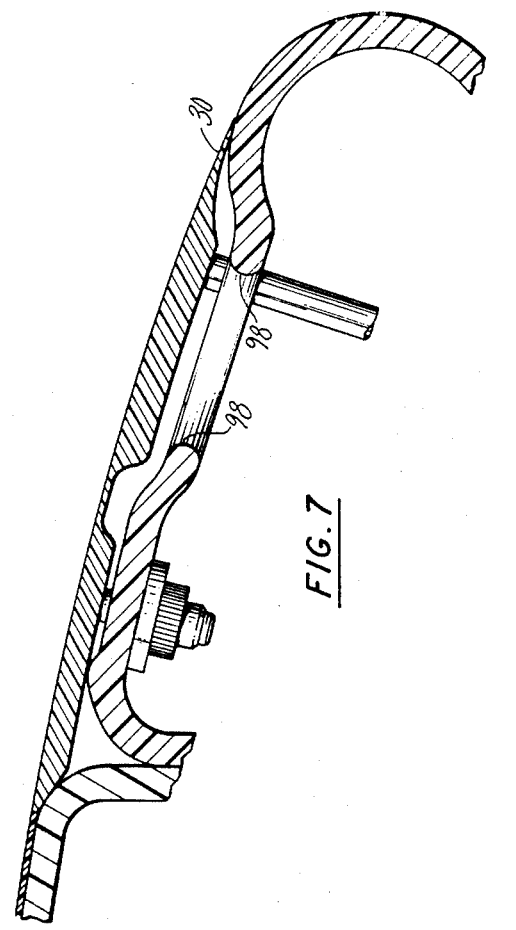
FIG. 7 is a section through the upper surface of the rotor blade shown in FIG. 5.

In FIG. 7, which is a section through the upper surface of a rotor blade, the rounding of the edges of the air holes can be seen at 98. This is done to keep pressure losses as low as possible. Also, the shape of slot lip 30 is apparent.

It should be understood that the invention is not limited to the particular embodiment shown and described herein, but that various changes and modifications may be made without departing from the spirit or scope of this concept as defined by the following claims.

We claim:

1. A rotor blade of advanced composite material for a circulation control aircraft having along a portion of its span an edge section consisting of a Coanda surface, a duct having an upper and lower surface located within said edge section for providing compressed air to be discharged adjacent the top of the Coanda surface to flow around the outside of the Coanda surface, and flexible panel means for controlling compresses air discharge, said panel comprising a first portion for attachment of said panel to said upper duct surface and a second portion including a lip defining with an upper portion of the Coanda surface a spanwise extending slot through which compressed air is discharged, said panel also having a spanwise section of reduced thickness between said first and second portions, means for attaching said panel first portion to said upper duct surface, means including a pivot point interposed between said panel first portion and said upper duct surface for establishing a preload on said panel so that said slot is closed until a minimum duct air pressure is reached, means for limiting the movement of said panel second portion in response to duct air pressure so as to establish a maximum slot opening 3, said limiting means including spanwise located screw means having at one end abutment means adapted to limit opening movement of said panel second portion and having at the other end means for anchoring said limiting means in said lower duct surface, said lower duct surface being of enhanced strength to tolerate greater air pressure in said duct without bending, said upper surface of said compressed air duct having a plurality of spanwise located holes for the flow of air therethrough to said Coanda surface, said holes being located between adjacent screw means and having outboard edges of rectangular shape.

2. A rotor blade of advanced composite material for a circulation control aircraft along a portion of its span an edge section consisting of a Coanda surface, a duct having a first and second area located within said edge section for providing compressed air to be discharged adjacent the Coanda surface to flow over the Coanda surface, said air duct having inboard upper and lower corners, a flexible panel for controlling compressed air discharge, said panel comprising an inboard panel portion and an outboard panel portion including a lip defining, with a portion of the Coanda surface, a spanwise extending slot through which compressed air is discharged, force equilibrium means for said duct including first and second panel attachment means, said first panel attachment means being associated with said duct first area and said inboard panel portion to establish a preload on said panel so that said slot is closed until a minimal duct air pressure is reached, wherein said first panel attachment means is located relatively close to the duct inboard upper corner so as to provide minimum bending moment at said inboard corner, said second panel attachment means being associated with the outboard panel portion for limiting the movement of said panel portion in response to duct air pressure so as to establish a maximum slot opening, said second panel attachment means being attached to said duct second area so as to transmit air pressure loads on said outboard panel portion across the duct interior to said duct second area, the connection of said second panel attachment means to said duct second area being located substantially at the center of the duct second area, creating a bending moment at the duct inboard lower corner, thereby minimizing the bending moment at the duct inboard upper corner.

* * * * *